Figure 1:
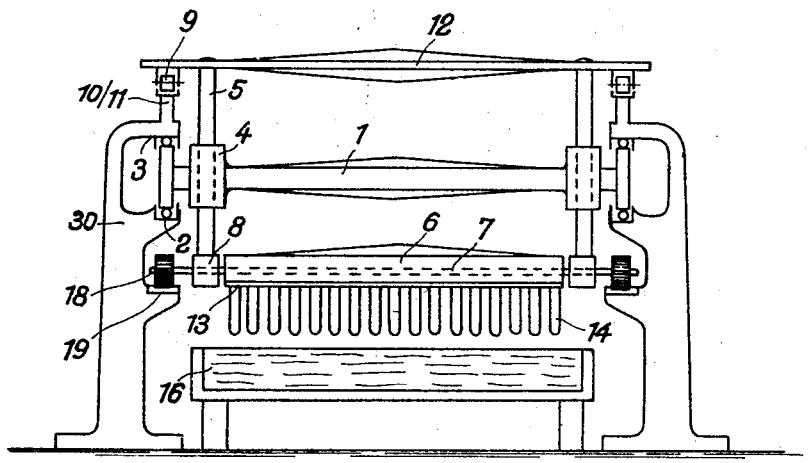

Aug. 16, 1932.  O. SINDL  1,872,190

CAPSULING MACHINE

Filed July 8, 1931  2 Sheets-Sheet 1

Inventor:

Aug. 16, 1932.    O. SINDL    1,872,190
CAPSULING MACHINE
Filed July 8, 1931    2 Sheets-Sheet 2

Inventor:

Patented Aug. 16, 1932

1,872,190

UNITED STATES PATENT OFFICE

OTTO SINDL, OF BERLIN, GERMANY

CAPSULING MACHINE

Application filed July 8, 1931, Serial No. 549,471, and in Germany June 7, 1930.

This invention relates to apparatus for the manufacture of hollow bodies by dipping molds into solutions of film-forming substances, wherein the molds are conveyed in a continuous movement from the immersion point, through treatment baths and other treatment installations, back to the immersion point again, whereupon the series of operations re-commences without interruption.

By means of the apparatus according to the invention hollow bodies such as shrinkage capsules for capsuling bottles can be produced in a completely automatic and continuous manner without employing human labour.

The essence of the invention consists in the fact that the immersion molds, with their carriers, are movably connected in such a way that the immersion in baths and treatment installations and the withdrawal therefrom, and also the rotary movements of the molds necessary for the uniform distribution of the immersion material, are effected in a vertical plane parallel to the direction of forward movement, during the continuous forward movement of the carriers, by movements of the molds in relation to the carriers, for which purposes special guides for the molds are provided.

The object in view, namely the automatic raising and lowering of the molds and the rotation thereof during the forward movement of the carriers, necessitates the molds being movable in a vertical direction and at the same time rotatable in a vertical plane parallel to the direction of forward movement. The molds must therefore be arranged in relation to their carriers in such a way as to be movable in a two-fold sense.

For the production of these two kinds of movement at least two separate guides are necessary, on the one hand a guide for effecting the raising and lowering in a vertical direction, and on the other hand a guide for effecting rotation in a vertical plane parallel to the direction of forward movement of the carriers.

The apparatus as a whole therefore comprises:—

(1) A guiding track for the main carriers;
(2) the carriers themselves, which move in the said track;
(3) elements which are vertically movable on the carriers, and which, by co-operating with the guide pertaining thereto, are raised and lowered in consequence of the forward movement of the carriers;
(4) rotatably arranged on the said vertically movable elements, the immediate carrying elements of the molds, which, by co-operating with the guide pertaining thereto, are rotated in such a way that the molds revolve in a vertical plane parallel to the forward movement of the carriers;
(5) the molds themselves, which are immovably arranged on the last-mentioned elements.

The vertically movable elements and the mold-carrying elements are provided with suitable devices by means of which their cooperation with the guides is accomplished, for instance pins, rollers, toothed wheels or the like.

Figure 2:
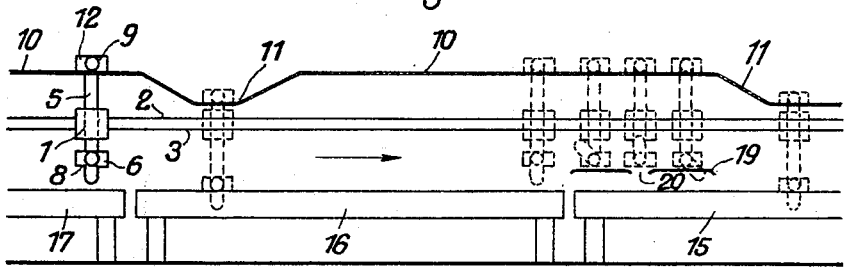
Figure 3:
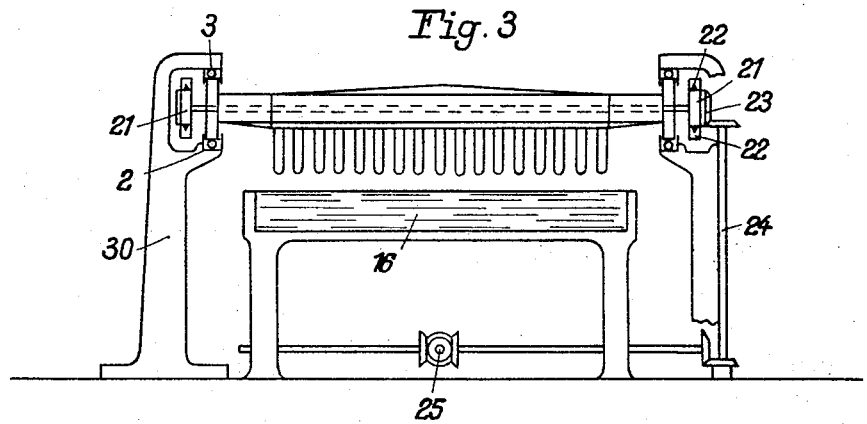
Figure 4:
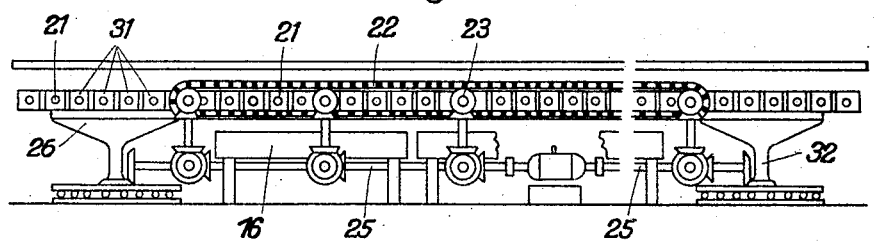
Figure 5:
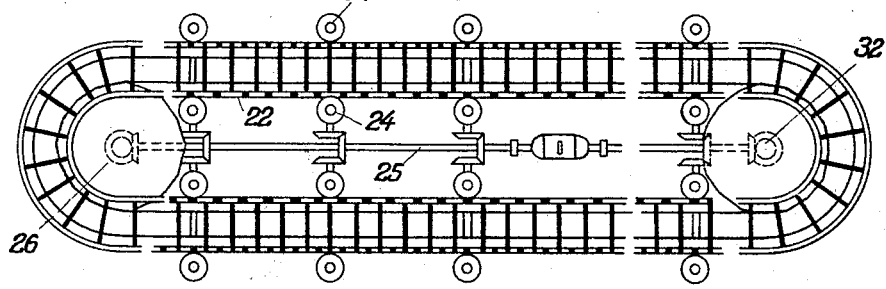
Figure 6:
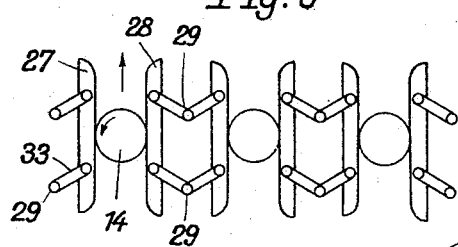

One constructional example of the invention is diagrammatically illustrated in the accompanying drawings, in which Figure 1 is a cross section, and
Figure 2 a longitudinal section through a bottle-capsuling machine according to the invention;
Figure 3 is a view corresponding to Fig. 1, except that the carriage is diagrammatically simplified therein, whereas the driving means for the carriages is illustrated in cross section, and here consists of chains and gears;
Figure 4 shows a longitudinal sectional elevation through the carriage-transporting plant;
Figure 5 is a horizontal section through the transporting plant, and
Figure 6 is a diagrammatic view of the cutting device for the hollow bodies.

The main carrier or girder 1 is constructed as a carriage, which runs by means of wheels between rails 2 and 3, which are mounted on supporting columns 30. The movement of the carriers may be obtained in any convenient manner, preferably by means of chains. In a single immersion installation any desired number of such carriages may run close behind one another according to the length of the track. Their distance apart is dependent upon the length of the dipping molds, which of course should not touch those of the adjacent carriages during rotation. Each carriage is provided with two bushes 4, through which vertical holes are bored, in each of which a pin or journal 5 is movable. These journals are connected with one another at their upper ends by means of a cross bar 12, which is provided on each end with a roller 9, these rollers running upon guiding rails, which are provided with hills 10 and dales 11. At its lower end each journal carries a bearing 8 for the reception of a shaft 7, to which is secured a cross bar 6, reinforced by ribs. The cross bar 6 carries a detachable mold ledge 13, to which the molds 14 are secured in a single row. To both ends of the shaft 7 are fitted toothed wheels 18, which are adapted to roll upon guiding racks 19 arranged at the sides of the track, whereby the shaft 7, together with the molds 14, is set in rotation. The racks 19 are interrupted at suitable positions 20, whereby the result is obtained that the rotary movement of the molds is temporarily discontinued. In order that the molds may be able to come to a standstill in any position, resilient detents are provided.

The method of operation of the apparatus is substantially as follows:—

The carriages run upon the track rail 2 throughout the entire plant. The carriage 1, in Figure 2, is coming out of the cleaning plant 17. The guiding rollers 9 are running upon the hill portion 10 of the upper guiding rails. As the carriage advances in the direction of the arrow, the rollers arrive at the valley part 11 of the rails. The journal 5, together with the parts connected with it, is thereby lowered in such a way that the molds dip into a bath 16 containing the immersion material. After a short time the journal rises again, and the excess immersion material can run off. The carriage now comes into the region of the racks 19, upon which the toothed wheels 18 roll, as a result of which the molds are set in rotation. At the point 20 the rotation of the molds is interrupted. After repeated rotation on the succeeding part of the rack, the molds resume the position with their necks downwards. Shortly after this the carriage arrives at a point at which the guiding rail descends. The molds are hereby lowered into a precipitating bath 15. If the molds are to be introduced into other baths, or to be passed through any other treatment installations, such for example as washing baths, cutting plant or stripping plant or cleaning baths for the molds, the means just described for moving the molds may be brought into operation in the same or a similar manner.

Various modifications of the apparatus are possible, which however do not affect the essence of the invention. Thus for example instead of the toothed wheels 18, friction wheels may be employed, the racks 19 being replaced by friction rails. Instead of providing the rollers 19 at the upper end of the journals 5 they might be provided on the shaft 7 beside the toothed wheels 18. In this case of course the rails 10, 11 would also have to be provided laterally of the racks 19, in such a way that the rails run at the same height as the racks at the turning positions.

The apparatus may be employed not only in the case of endless tracks, but in the case of tracks of all kinds. It is only necessary that the carriages should be accurately and reliably guided, and should always be parallel to one another, in order that the contemplated movements of the molds should be able to take place satisfactorily.

The carriages 1 may be provided with guiding surfaces 21, which are connected with one another like chains. The driving of the carriages is preferably effected by means of chains 22, which engage with lugs on the guiding surfaces, and which are continuous. The chain formed by the guiding surfaces is driven by polygonal drums 32, which are rotatable about vertical axes in the semicircular portions of the track. The guiding surfaces then bear accurately upon the surfaces of the polygonal drums. The chains 22 and the drums 32 are actuated by a common drive 25, 24, 23.

Upon the closed track, the molds mounted on the carriages can be guided through all the treatment positions, through the immersion position, the precipitating baths, any washing baths, cutting devices, stripping devices, mold-washing and drying devices, mold-changing positions and the like, right back to the dipping position. The molds that have already been capped once may if desired be coated again after the peeling or drying of the first coating, and for this purpose one or more additional dipping points may be included in the circuit.

At one part of the track there may be arranged, preferably at the same level, knives 27 and pressure strips 28 resiliently arranged in pairs, between which the coated molds are passed, the coatings upon the molds being set in rotation by the pressure of the strips, introduced into the knives and thereby cut off. Both knives and pressure strips may be resiliently displaced parallel to one another about pivots 29 by means of arms 33 of equal length.

In order to strip the coatings off the molds, gripping members may be placed in the path of the molds, these gripping members being adapted to penetrate resiliently under the edge of a coating, and to strip the coating off the mold as the mold advances.

According to the new process, and its method of operation by means of the apparatus described, capsule-like structures and other bodies admit of being produced in uninterrupted operation at a high working speed by the immersion process. The capacity of such plant is an average about six to eight times as great as that of an immersion plant of the construction hitherto used, and employs only about one-sixth to one-eighth of labour, so that the structures, such as capsules for example, can be produced at less than half the cost hitherto involved.

By virtue of the mechanically automatic method of working, the process can easily be adapted by regulating the running and revolving speeds, and the solution draining distances, to dipping solutions of different viscosities, and exceedingly uniform products can be obtained, independently of the varying attentiveness and skill of the workmen employed.

What I claim is:—

1. In a machine for the manufacture of capsules, an endless plane rail track, and a carriage movable upon this track, rods vertically displaceable in this carriage, shaft bearings on these rods, a shaft passing through these bearings, a cross bar mounted upon this shaft, a ledge on this cross bar adapted to carry capsule molds, means for vertically displacing the rods relatively to the carriage, and means for rotating the shaft in its bearings.

2. In a capsuling machine, an endless plane rail track, carriages movable upon this rail track, vertically bored bushes on these carriages, vertically displaceable rods passing through these bushes, the upper ends of the rods being connected by a cross bar, rollers on this cross bar, guiding rails arranged laterally with respect to the rail track, raised and lowered portions on these guiding rails, the rollers of the cross bar running upon these lateral guiding rails and being adapted to raise and lower the rods, shaft bearings at the lower ends of the rods, a shaft in these bearings, a cross bar on the shaft, a ledge on this cross bar adapted to carry capsule molds, toothed wheels mounted on the shaft outside the bearings, and racks arranged laterally with respect to the rail track, the toothed wheels of the shaft being adapted to mesh with the racks and to set the shaft, with the molds, in rotation in such a way that the molds revolve in a vertical plane parallel to the direction of movement of the carriages.

3. In a capsuling machine, an endless plane rail track, carriages movable upon this rail track, vertically bored bushes on these carriages, vertically displaceable rods passing through these bushes, the upper ends of the rods being connected by a cross bar, rollers on this cross bar, guiding rails arranged laterally with respect to the rail track, raised and lowered portions on these guiding rails, the rollers of the cross bar running upon these lateral guiding rails and being adapted to raise and lower the rods, shaft bearings at the lower ends of the rods, a shaft in these bearings, a cross bar on the shaft, a ledge on this cross bar adapted to carry capsule molds, friction wheels mounted on the shaft outside the bearings, and friction rails arranged laterally with respect to the rail track, the friction wheels of the shaft being adapted to roll upon the friction rails, and to set the shaft, with the molds, in rotation in such a way that the molds revolve in a vertical plane parallel to the direction of movement of the carriages.

4. In a capsuling machine an endless plane rail track, carriages movable upon this rail track, vertically bored bushes on these carriages, vertically displaceable rods passing through these bushes, shaft bearings at the lower ends of the rods, a shaft passing through these bearings, a cross bar on this shaft, a ledge carrying capsule molds on the cross bar, a toothed wheel keyed fast to the shaft outside the bearings at each end, a roller rotatably mounted on the shaft outside the bearings at each end, guiding rails arranged one on each side of the rail track, the said guiding rails having raised and lowered portions adapted to raise and lower the shaft provided with rollers, and laterally arranged racks, one on each side of the rail track, adapted by the rolling of the toothed wheels secured to the shaft to rotate the shaft with the molds, the racks being interrupted so as to occasion interruption in the rotating of the shaft.

5. In a capsuling machine an endless plane rail track, carriages movable upon this track, capsule molds movable arranged on these carriages, means for vertically displacing the molds with respect to the carriages during the movement of the carriages along the track, means for rotating the molds in a vertical plane parallel to the direction of movement of the carriages, the rail track being in the form of a rectangle with semicircular ends, and having two parallel rails, the carriages running upon the rail track having lateral guiding plates, and the guiding plates of the carriages being connected with one another like the links of a chain, endless chains arranged one on each side of the track rails, lugs on the carriages adapted to be engaged for driving purposes by the chains, polygonal drums rotatable about vertical axes at the centres of curvature of the semicircular end portions of the rail track, the sides of the polygonal drums being adapted to serve as bearing surfaces for the guiding plates of the carriages, and common driving means for the chains and drums.

6. In a capsuling machine an endless plane rail track, carriages movable upon this track, capsule molds movably arranged on these carriages, means for vertically displacing the molds with respect to the carriages during the movement of the carriages along the track, means for rotating the molds in a vertical plane parallel to the direction of movement of the carriages, the rail track being in the form of a rectangle with semicircular ends, and resilient longitudinal bars and knives arranged in such a manner that the forwardly travelling molds carrying capsules each run through between a bar and a knife, which are adapted to set the capsule upon the mold in rotation and to cut the capsule.

In testimony whereof I have signed my name to this specification.

ING. OTTO SINDL.